United States Patent [19]

Blackwood

[11] Patent Number: 6,157,163
[45] Date of Patent: Dec. 5, 2000

[54] AUTOMOBILE CHARGING UNIT FOR A PAGER

[76] Inventor: Reginald S. Blackwood, 839 N. Campus Ave., Upland, Calif. 91786

[21] Appl. No.: 09/407,405

[22] Filed: Sep. 28, 1999

[51] Int. Cl.[7] .............................. H02J 7/00; H01R 13/60; H02M 1/00
[52] U.S. Cl. .......................... 320/115; 363/146; 439/529
[58] Field of Search .................................... 320/115, 107; 363/146; 439/529, 527, 162

[56] References Cited

U.S. PATENT DOCUMENTS

| | | | |
|---|---|---|---|
| D. 234,370 | 2/1975 | Lay et al. ................................ | D13/108 |
| D. 368,465 | 4/1996 | Scheid et al. .......................... | D13/108 |
| D. 373,756 | 9/1996 | Chen ....................................... | D13/108 |
| 4,936,796 | 6/1990 | Anderson ............................... | 439/620 |
| 5,689,413 | 11/1997 | Jaramillo et al. ....................... | 363/146 |
| 5,839,919 | 11/1998 | Chen ....................................... | 439/529 |

Primary Examiner—Peter S. Wong
Assistant Examiner—Gregory J Toatley, Jr.
Attorney, Agent, or Firm—Goldstein & Canino

[57] ABSTRACT

An automobile charging unit for a pager including an adapter portion dimensioned for being received within a standard cigarette lighter socket of a vehicle. The adapter portion has contacts thereon for mating with charging contacts within the cigarette lighter socket. A flexible neck portion extends outwardly from an outer end of the adapter portion. A pivot ball joint is secured to an outer free end of the flexible neck portion. A pager housing is provided that is dimensioned for receiving a pager therein. The pager housing has a charging contact therein in communication with the contacts of the adapter portion. The charging contact aligns with a charging contact of the pager when positioned within the pager housing. The pager housing includes a back wall secured to the pivot ball joint.

5 Claims, 2 Drawing Sheets

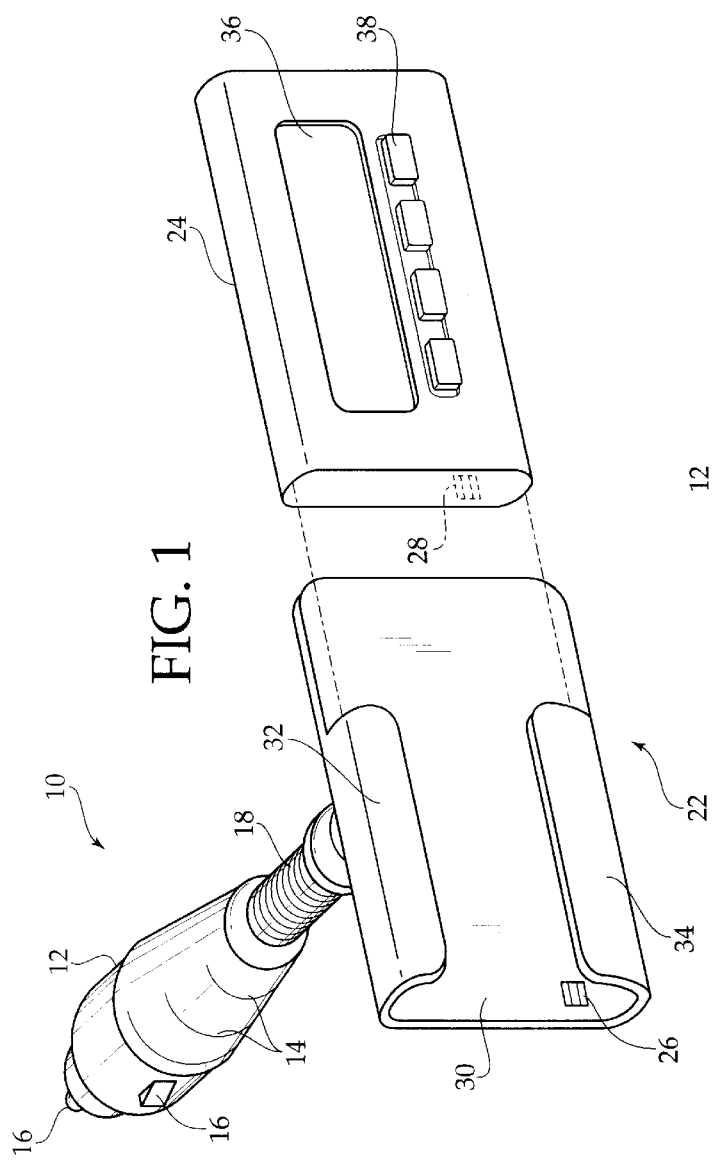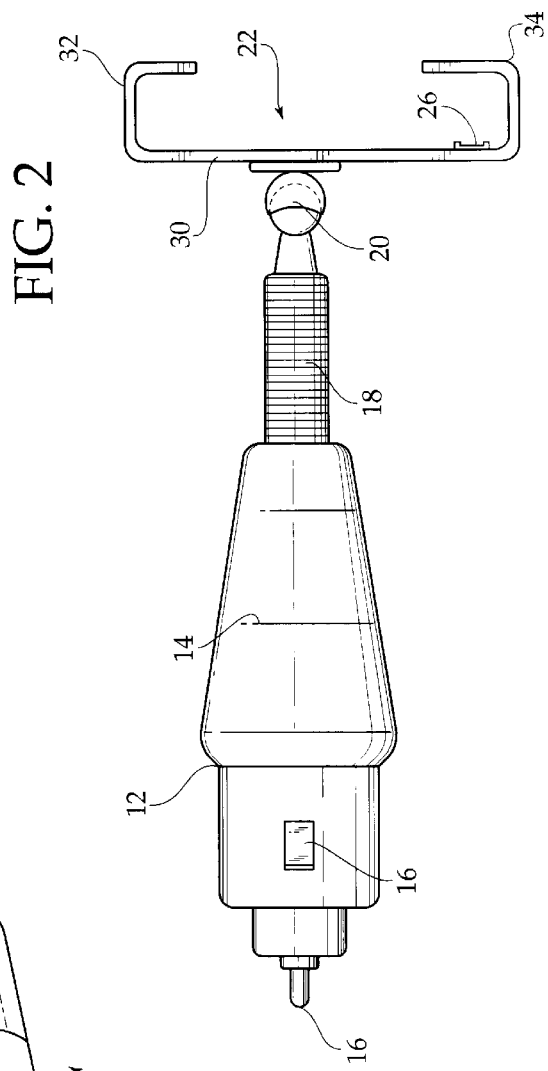

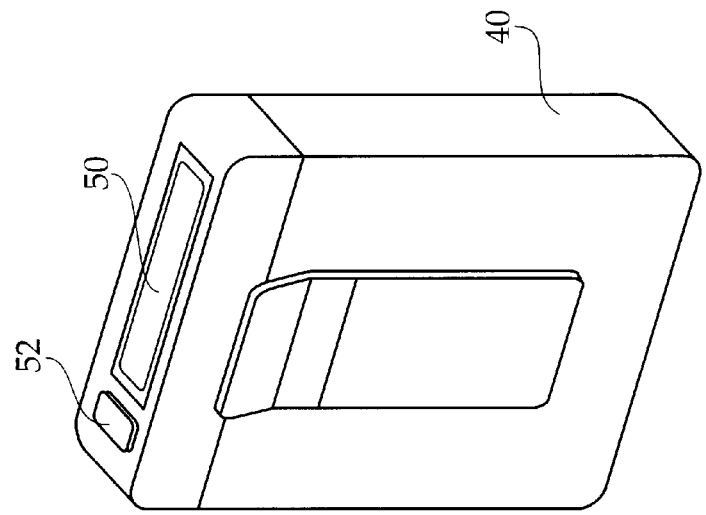
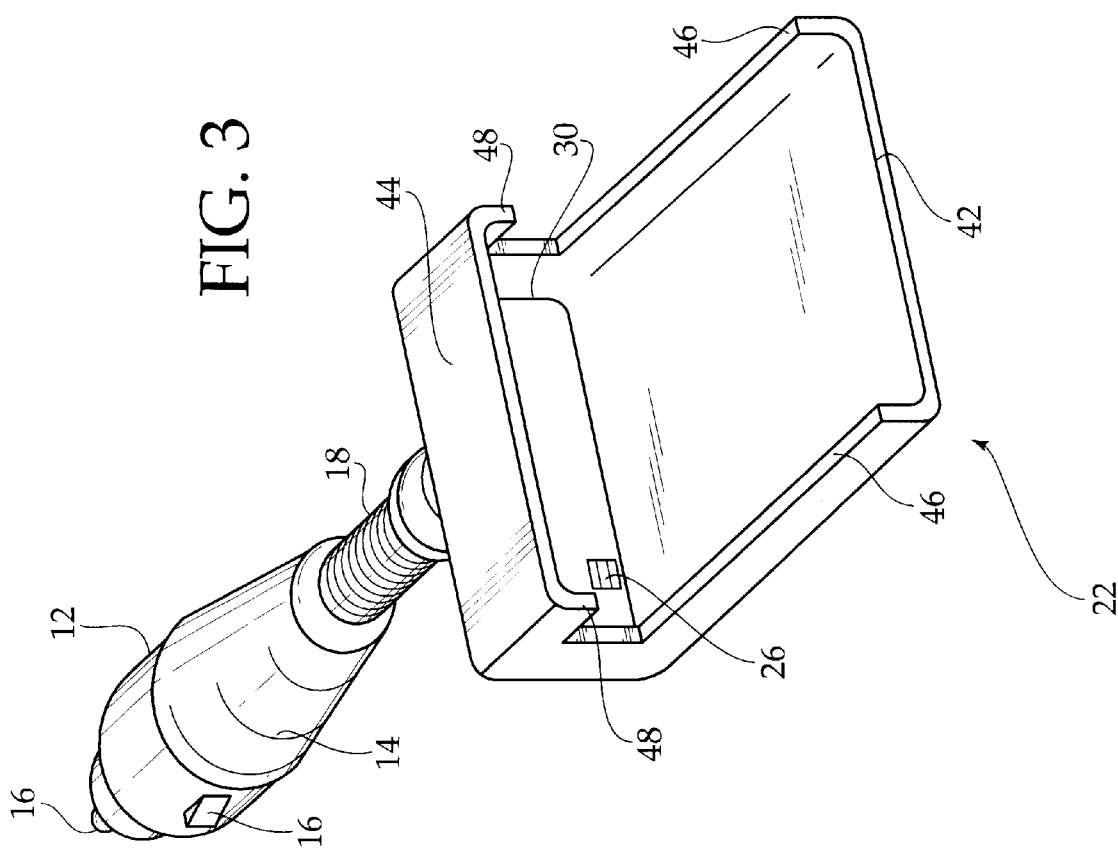
FIG. 3

AUTOMOBILE CHARGING UNIT FOR A PAGER

BACKGROUND OF THE INVENTION

The present invention relates to an automobile charging unit for a pager and more particularly pertains to allowing a battery-powered pager to be charged within an automobile.

Various accessories include adapters that allow for their charging within an automobile. These items include cellular telephones, vacuum cleaners, and other items. The use of adapters in vehicles allow those people who are busy and "on the go" to utilize their vehicle to maintain these items in proper working order at all times.

The use of pagers has grown rapidly over the last ten years. Although primarily used for doctors in the past, now these devices are carried by high school students as a way of being reached by other parties. The advances in technology of pagers has also seen a meteoric rise. One of these advances is the use of a rechargeable battery for pagers. Thus, there is a need for a method of recharging these batteries while in the automobile.

The present invention provides a device that will enable the abovementioned problem to be solved by utilizing a special adapter that will couple with a cigarette lighter of the automobile and has a bracket for coupling with the pager.

The use of battery charging devices is known in the prior art. More specifically, battery charging devices heretofore devised and utilized for the purpose of charging batteries are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,936,796 to Anderson discloses an adapter that allows electrical accessories to be operated from a vehicle. U.S. Pat. Nos. Des. 324,370 to Lay, Des. 373,756 to Chen, and Des. 368,465 to Scheid show ornamental designs for various battery charging devices.

While these devices fulfill their respective, particular objective and requirements, the aforementioned patents do not describe an automobile charging unit for a pager for allowing a battery-powered pager to be charged within an automobile.

In this respect, the automobile charging unit for a pager according to the present invention substantially departs from the conventional concepts and designs of the prior art, and in doing so provides an apparatus primarily developed for the purpose of allowing a battery-powered pager to be charged within an automobile.

Therefore, it can be appreciated that there exists a continuing need for new and improved automobile charging unit for a pager which can be used for allowing a battery-powered pager to be charged within an automobile. In this regard, the present invention substantially fulfills this need.

SUMMARY OF THE INVENTION

In the view of the foregoing disadvantages inherent in the known types of battery charging devices now present in the prior art, the present invention provides an improved automobile charging unit for a pager. As such, the general purpose of the present invention, which will be described subsequently in greater detail, is to provide a new and improved automobile charging unit for a pager and method which has all the advantages of the prior art and none of the disadvantages.

To attain this, the present invention essentially comprises an adapter portion dimensioned for being received within a standard cigarette lighter socket of a vehicle. The adapter portion has knurls formed thereon. The adapter portion has contacts thereon for mating with charging contacts within the cigarette lighter socket. A flexible neck portion extends outwardly from an outer end of the adapter portion. A pivot ball joint is secured to an outer free end of the flexible neck portion. A pager housing is provided that is dimensioned for receiving a pager therein. The pager housing has a charging contact therein in communication with the contacts of the adapter portion. The charging contact aligns with a charging contact of the pager when positioned within the pager housing. The pager housing includes a back wall secured to the pivot ball joint. The back wall has generally L-shaped engagement brackets on upper and lower edges thereof for containing the pager against the back wall.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved automobile charging unit for a pager which has all the advantages of the prior art battery charging devices and none of the disadvantages.

It is another object of the present invention to provide a new and improved automobile charging unit for a pager which may be easily and efficiently manufactured and marketed.

It is a further object of the present invention to provide a new and improved automobile charging unit for a pager which is of durable and reliable construction.

An even further object of the present invention is to provide a new and improved automobile charging unit for a pager which is susceptible of a low cost of manufacture with regard to both materials and labor, and which accordingly is then susceptible of low prices of sale to the consuming public, thereby making such an automobile charging unit for a pager economically available to the buying public.

Even still another object of the present invention is to provide a new and improved automobile charging unit for a pager for allowing a battery-powered pager to be charged within an automobile.

Lastly, it is an object of the present invention to provide a new and improved automobile charging unit for a pager including an adapter portion dimensioned for being received within a standard cigarette lighter socket of a vehicle. The adapter portion has contacts thereon for mating with charging contacts within the cigarette lighter socket. A flexible neck portion extends outwardly from an outer end of the adapter portion. A pivot ball joint is secured to an outer free end of the flexible neck portion. A pager housing is provided that is dimensioned for receiving a pager therein. The pager housing has a charging contact therein in communication with the contacts of the adapter portion. The charging contact aligns with a charging contact of the pager when positioned within the pager housing. The pager housing includes a back wall secured to the pivot ball joint.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the automobile charging unit for a pager constructed in accordance with the principles of the present invention.

FIG. 2 is a side elevation view of the present invention.

FIG. 3 is a perspective view of an alternate embodiment of the present invention.

The same reference numerals refer to the same parts through the various figures.

DESCRIPTION OF THE PREFERRED EMBODIMENT

With reference now to the drawings, and in particular, to FIGS. 1 through 3 thereof, the preferred embodiment of the new and improved automobile charging unit for a pager embodying the principles and concepts of the present invention and generally designated by the reference number 10 will be described.

Specifically, it will be noted in the various Figures that the device relates to a automobile charging unit for a pager for allowing a battery-powered pager to be charged within an automobile. In its broadest context, the device consists of an adapter portion, a flexible neck portion, a pivot ball joint, and a pager housing. Such components are individually configured and correlated with respect to each other so as to attain the desired objective.

The adapter portion 12 is dimensioned for being received within a standard cigarette lighter socket of a vehicle. The adapter portion 12 has knurls 14 formed thereon. The knurls 14 aid in the handling of the device 10. The adapter portion 12 has contacts 16 thereon for mating with charging contacts within the cigarette lighter socket.

The flexible neck portion 18 extends outwardly from an outer end of the adapter portion 12. The flexible neck portion 18 allows the device 10 adjust its angular orientation with respect to the vehicle so that the pager can be properly viewed.

The pivot ball joint 20 is secured to an outer free end of the flexible neck portion 18. The ball joint 20, along with the flexible neck portion 18, allow the device 10 to be adjusted to suit the needs of the user.

The pager housing 22 is dimensioned for receiving a pager 24 therein. The pager housing 24 has a charging contact 26 therein in communication with the contacts 16 of the adapter portion 12. The charging contact 26 aligns with a charging contact 28 of the pager 24 when positioned within the pager housing 22. The pager housing 22 includes a back wall 30 secured to the pivot ball joint 20. The back wall 30 has generally L-shaped engagement brackets 32,34 on upper end lower edges thereof for containing the pager 24 against the back wall 30. Thus, as illustrated in FIG. 1, the pager 24 slides within the pager housing 22 between the brackets 32,34 and against the back wall 30. This pager housing 22 would be used with pagers having a display 36 and function buttons 38 on the front face, as illustrated in FIG. 1.

A second embodiment of the present invention is shown in FIG. 3 and includes substantially all of the components of the present invention with a variation of the pager housing. In this embodiment, the pager housing 22 is adapted for a standard alpha-numeric pager 40. The back wall 30 of the pager housing 22 has a long horizontal lower wall 42 extending forwardly therefrom and a short horizontal upper wall 44 extending forwardly therefrom for receiving the pager 40 therebetween. The lower wall 42 and the upper wall 44 each have inwardly turned edges 46,48 to contain the pager 40 therein. Thus, in this embodiment, the pager 40 is slid rearwardly into the pager housing 22 so that the display 50 and function button 52, on the top edge of the pager 40, are facing out towards the user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An automobile charging unit for a pager for allowing a battery-powered pager to be charged within an automobile comprising, in combination:

an adapter portion dimensioned for being received within a standard cigarette lighter socket of a vehicle, the adapter portion having knurls formed thereon, the adapter portion having contacts thereon for mating with charging contacts within the cigarette lighter socket;

a flexible neck portion extending outwardly from an outer end of the adapter portion;

a pivot ball joint secured to an outer free end of the flexible neck portion;

a pager housing dimensioned for receiving a pager therein, the pager housing having a charging contact therein in communication with the contacts of the adapter portion, the charging contact aligning with a charging contact of the pager when positioned within the pager housing, the pager housing including a back wall secured to the pivot ball joint, the back wall having generally L-shaped engagement brackets on upper and lower edges thereof for containing the pager against the back wall.

2. An automobile charging unit for a pager for allowing a battery-powered pager to be charged within an automobile comprising, in combination:

an adapter portion dimensioned for being received within a standard cigarette lighter socket of a vehicle, the adapter portion having contacts thereon for mating with charging contacts within the cigarette lighter socket;

a flexible neck portion extending outwardly from an outer end of the adapter portion;

a pivot ball joint secured to an outer free end of the flexible neck portion;

a pager housing dimensioned for receiving a pager therein, the pager housing having a charging contact therein in communication with the contacts of the adapter portion, the charging contact aligning with a charging contact of the pager when positioned within the pager housing, the pager housing including a back wall secured to the pivot ball joint.

3. The automobile charging unit for a pager as set forth in claim 2 wherein the adapter portion has knurls formed thereon.

4. The automobile charging unit for a pager as set forth in claim 2 wherein the back wall has generally L-shaped engagement brackets on upper and lower edges thereof for containing the pager against the back wall.

5. The automobile charging unit for a pager as set forth in claim 2 wherein the back wall has a long horizontal lower wall extending forwardly therefrom and a short horizontal upper wall extending forwardly therefrom for receiving the pager therebetween, the lower wall and the upper wall each having inwardly turned edges.

* * * * *